UNITED STATES PATENT OFFICE.

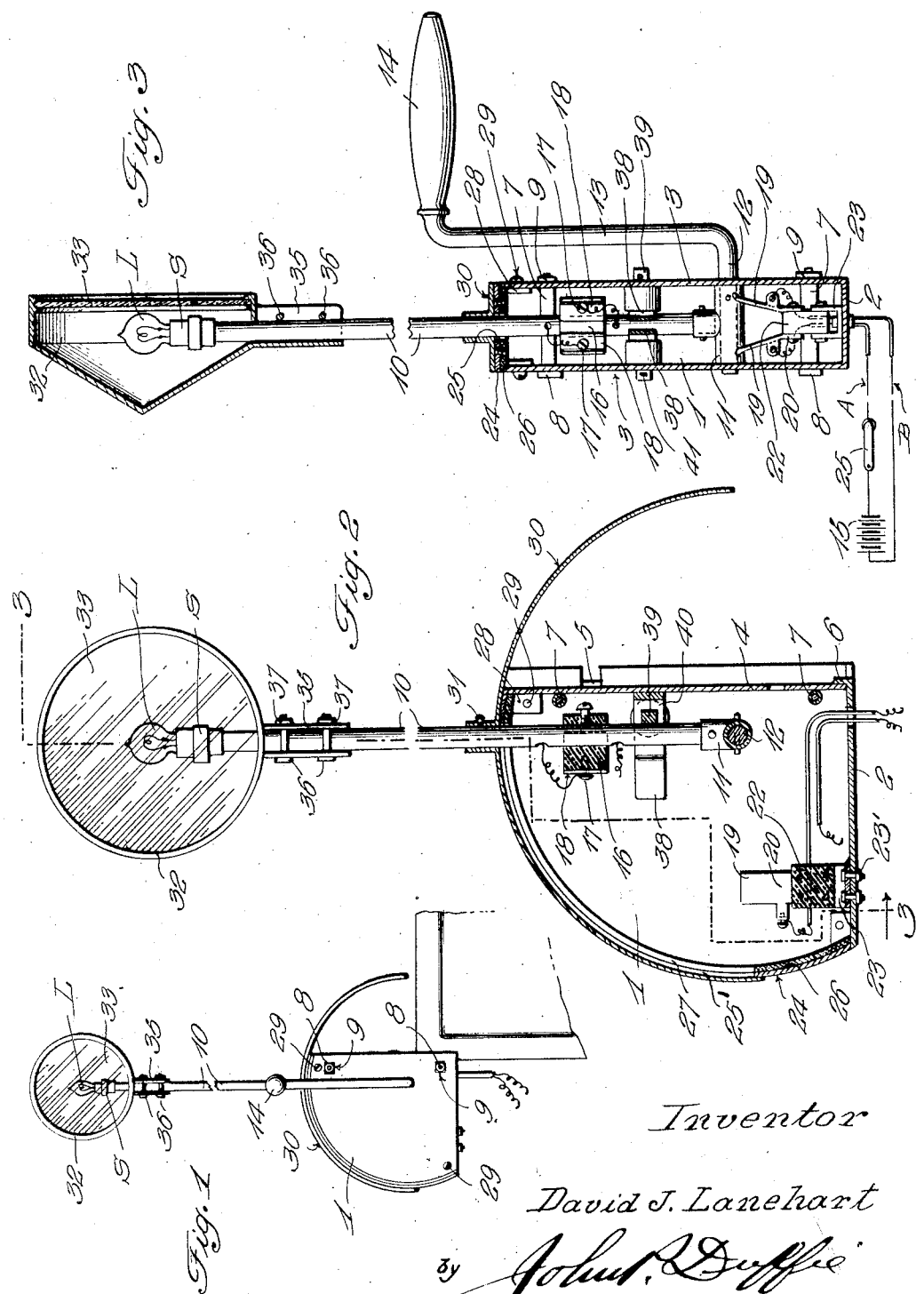

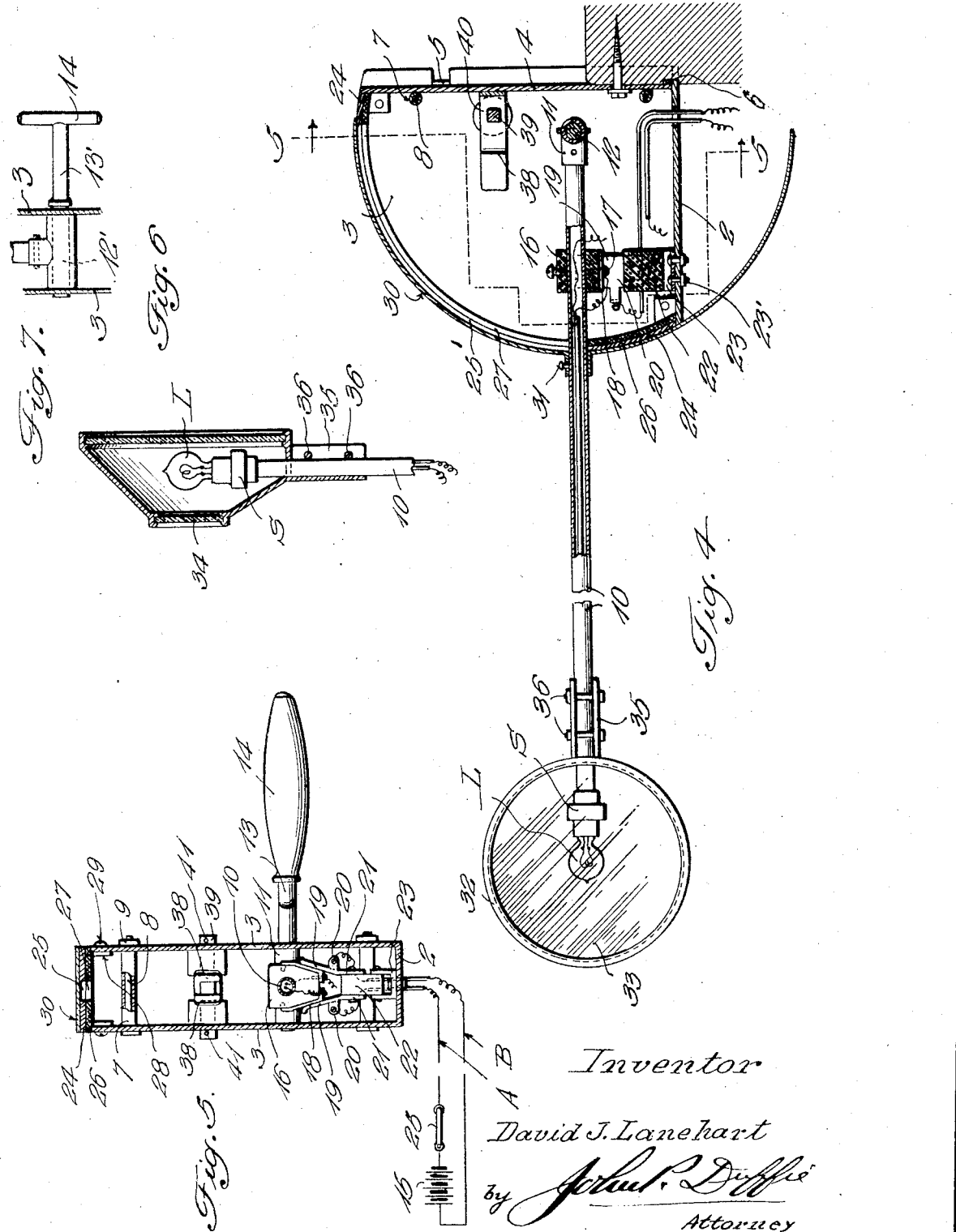

DAVID J. LANEHART, OF BALTIMORE, MARYLAND.

SIGNAL FOR AUTOMOBILES.

1,215,037.

Specification of Letters Patent.

Patented Feb. 6, 1917.

Application filed May 16, 1916. Serial No. 97,834.

*To all whom it may concern:*

Be it known that I, DAVID J. LANEHART, a citizen of the United States, residing at Baltimore, and State of Maryland, have invented certain new and useful Improvements in Signals for Automobiles, of which the following is a specification.

This invention relates to new and useful improvements in signals for automobiles or other motor vehicles.

In many sections of the country where traffic regulations are enforced, operators of motor vehicles are required to signify their intention when turning a corner or when turning the vehicle so that operators of vehicles either in the rear or approaching and pedestrians may be advised of the intention of the operator desiring to turn the machine with the result that a casualty of any kind is avoided. Such signals are usually given by the movement of the hand and arm and are not always observable, particularly by the operator of a following vehicle.

The present invention provides a signal which is readily observable both by night and day and which may be seen by the operator of a following vehicle as well as by the driver of an approaching machine or vehicle, said signal being illuminated by night and embodying an electric lamp which is included in a circuit that is closed when the signal arm is thrown outward into signaling position.

A further object of my invention is to provide a signal of the character specified which may be applied to any make or type of motor vehicle with but very little if any change in the construction thereof.

A still further object of my invention is to provide a signal of this character which will be compact, simple and economical in construction.

With the foregoing and other objects in view, the invention consists in the novel features of construction, combination and arrangement of parts illustrated in the drawings and more particularly pointed out in the appended claims.

In the accompanying drawings:—

Figure 1 is a side elevation of a signal embodying my improvements, illustrating one way in which the same may be applied or secured to the automobile or other motor vehicle.

Fig. 2 is a central vertical section of the signal, with the signal arm up, the parts shown on an enlarged scale.

Fig. 3 is a vertical transverse section, taken on the plane indicated by the dotted lines 3—3 of Fig. 2.

Fig. 4 is a view similar to Fig. 2, with the signal arm down and the circuit through the lamp closed.

Fig. 5 is a vertical transverse section, taken on the plane indicated by the dotted lines 5—5 of Fig. 4, looking in the direction indicated by the arrows.

Fig. 6 is a detail fragmentary view, partly in section, illustrating a modified form of casing for the lamp.

Fig. 7 is a fragmentary view, partly in section, of a modification of the operating handle.

Referring to the drawings for a more particular description of the invention, and in which like parts are designated by like characters throughout the several views, it will be seen that the signal comprises a substantially quadrant-shaped casing 1, which is open at the top or outer side and closed at the bottom by the wall or strip 2 extending between the bottom edges of the side walls or members 3, and also closed at its inner edge by the removable plate 4, slidably held in place between the inwardly bent lugs 5 and 6 and a pair of vertically spaced spacing sleeves 7 mounted on the bolts 8 which pass transversely through the side walls of the casing and are held in place by the fastening nuts 9. The spacing sleeves 7 aforesaid not only assist in holding the plate 4 in removable position but coöperate with the bolts and nuts 8 and 9, respectively, in holding the side walls of the quadrant shaped casing rigid.

For the purpose of illustration I have shown in Figs. 1 and 4, the signal as applied to the dash board of an automobile but in practice the signal may be attached to the top or side of the body of the car in front of the dash-board and wind-shield or : ; any other desired point within convenient reach of the driver or operator of the car and may be secured in place by any suitable means other than that shown in the drawings.

The signal further comprises a vertically disposed hollow and preferably tubular signal arm 10 which works up and down between the side walls or members of the casing and is connected at its lower end by the T-coupling 11 or other equivalent means with the inner end of the horizontal member 12 of the crank arm 13, equipped with the usual handle 14 which is grasped of course by the operator in raising and lowering the signal arm. In Fig. 7 there is illustrated a modification of the operating handle in which 13' is an extension of the horizontal member 12' and 14' is the handle. The signal arm, as shown, is provided at its upper end with a lamp L mounted in the socket S.

In practice, the circuit through the lamp L is closed to illuminate the same when the signal arm is down or in signal position, as indicated in Fig. 4. The current is supplied by the battery 15 and the circuit closed through the circuit wires A and B and the lamp when the signal arm is down, as above stated, by the following connections: A block 16 of insulating material, such for instance as hard rubber, is secured to the lower end of the signal arm at a point within the casing, the opposite sides of said block being beveled inwardly as shown and having secured thereto by screws 17 or other equivalent means, the metal contacts 18, adapted to be received by and to engage the upper outwardly inclined portions 19 of the metal contacts 20 secured at their lower straight ends 21 by screws or other equivalent means to opposite side of an insulating block 22, the lower end of which is received by and secured to a U-shaped clip 23 bolted or otherwise removably secured, as at 23', to the bottom wall of the casing 1.

A switch 25 is arranged in the circuit, as shown, so that the signal arm may be lowered in the day without closing the circuit through the lamp and illuminating the same, when said switch is open. When the switch is closed, as indicated in the drawings, and the signal down as shown in Figs. 4 and 5, the current passes from the positive side of the battery 15 and through the circuit wire A to one of the metal contacts 20 and thence to the adjacent contacting metal contact 18 and then from this point through the circuit wire A to the lamp L. After passing through the lamp, the current passes or returns to the negative side of the battery through the other circuit wire B and metal contacts 18 and 20, respectively, thus establishing a complete circuit through the lamp and illuminating the same. The circuit wires are of course insulated at all convenient points and especially where exposed and liable to come into contact with the driver or occupant of the car to which the signal is applied.

The top or open side of the casing is closed by a curved arc-shaped cover plate 24 provided throughout the greater portion of its length with a central longitudinal slot 25' through which the signal arm works, a packing strip 26, preferably of leather and provided with a longitudinal slot 27 corresponding and registering with that of the cover plate, being interposed between the bottom of the latter and the upper edges of the side walls of the casing to prevent any dampness or moisture entering the casing at the sides of the cover plate. The cover plate is removably secured to the casing 1 by the lugs and screws 28 and 29, respectively, the former being formed at the corners of the plate and fitting against the inner faces of the side walls of the casing.

A flat metal guard member or strip 30 of approximately semi-circular form is secured, as at 31, to the lower end of the signal arm and is arranged to slide or work over the top of the cover plate to exclude any dirt, dampness or moisture from the casing through the slot or opening in the cover plate, said guard strip being of greater length than that of the cover plate in order to fully cover or close the slot or opening thereof irrespective of the position of the signal arm.

The lamp L is inclosed by the casing 32 provided in rear of the lamp with a plate 33 of celluloid, glass or other suitable transparent material, the front of the casing being closed, as shown in Fig. 3 to give a greater reflection. However, if desired, a plate 34 may also be arranged in front of the lamp, as shown in Fig. 6 of the drawings, so that the lamp will be visible from the front as well as the rear. The casing is provided with a depending metal clip 35 which is formed integral or in one piece with the casing and is adapted to receive and be clamped to the upper end of the signal arm by the fastening bolts and nuts 36 and 37 or other equivalent means.

The signal arm is normally held in upright or vertical position by the clip 38 of resilient metal secured in place by the cross pin 39 which passes through the inner ends of the side members 40 of the clip or keeper and the side walls of the casing and is held in place by the cotter pins 41 or other equivalent means.

In the day, the switch is opened so that the circuit through the lamp L will be broken regardless of the position of the signal arm, the latter being normally held up by the clip or keeper 38. The operator or driver of the car, when wishing to turn a corner or turn the vehicle, signifies his intention of doing so by swinging the signal arm down, into the position indicated by Fig. 4, by means of the crank 13, such signals being usually given by movements of the hand and arm and not being always observable, particularly by the operator of a following car.

At night, the switch is closed so that the lamp will be illuminated when the signal is down into signaling position, it being understood that the circuit is broken and that the lamp is out when the signal arm is returned to upright or vertical position. If desired, however, the signal arm may be left down constantly at night, to furnish a signal for the operators of following or approaching vehicles on the straight-a-way as well as in making turns at corners or going over crossings.

From the foregoing description, taken in connection with the drawings, it is thought that the construction, operation and advantages of my invention will be readily understood without requiring a more extended explanation.

Various changes in the form, proportions and minor details of construction may be resorted to without departing from the principles or sacrificing any of the advantages of this invention as defined in the appended claims.

Having described my invention, what I claim as new and desire to secure by Letters Patent, is:—

1. A signal of the character specified comprising an oblong casing closed at the bottom and ends and open at the top, a signal arm pivotally mounted therein, a lamp at the upper end of the signal arm, a crank for swinging the signal arm either up or down, a casing provided with a transparent plate, inclosing the lamp and secured to the upper end of the signal arm, a source of electrical energy, suitable connections for establishing a circuit through the lamp when the signal arm is down, a switch in the circuit, a cover plate for the top of the casing, said plate provided with a central longitudinal slot throughout the greater part of its length through which the signal arm works and a flat metal guard strip of greater length than the cover plate, secured to and movable with the signal arm, said guard strip working over the top of the cover plate and serving to exclude dirt, dampness or rain from entering the casing through the slot or opening in the latter.

2. A signal of the character specified comprising a quadrant-like casing closed at the bottom and open at its top or outer edge, a removable cover plate closing the top of the casing, a signal arm pivotally mounted at its lower end in the casing and working between the side walls of the latter, a lamp at the upper end of the signal arm, manually operated means for operating the signal arm, a source of current, connections including a switch for closing the circuit through the lamp when the signal arm is down, a cover plate for the top of the casing, said plate provided with a central longitudinal slot through which the signal arm works and a packing strip interposed between the bottom of said cover plate and the outer edges of the side walls of the casing to prevent moisture or rain from entering the casing at the sides of the cover plate, said packing strip having a slot or opening corresponding and registering with that of the cover plate.

In testimony whereof I affix my signature in the presence of two witnesses.

DAVID J. LANEHART.

Witnesses:
PAUL MEEDING,
WILLIAM SANDS.